No. 785,864. PATENTED MAR. 28, 1905.
J. A. DAVIS.
HARROW ATTACHMENT.
APPLICATION FILED OCT. 15, 1904.
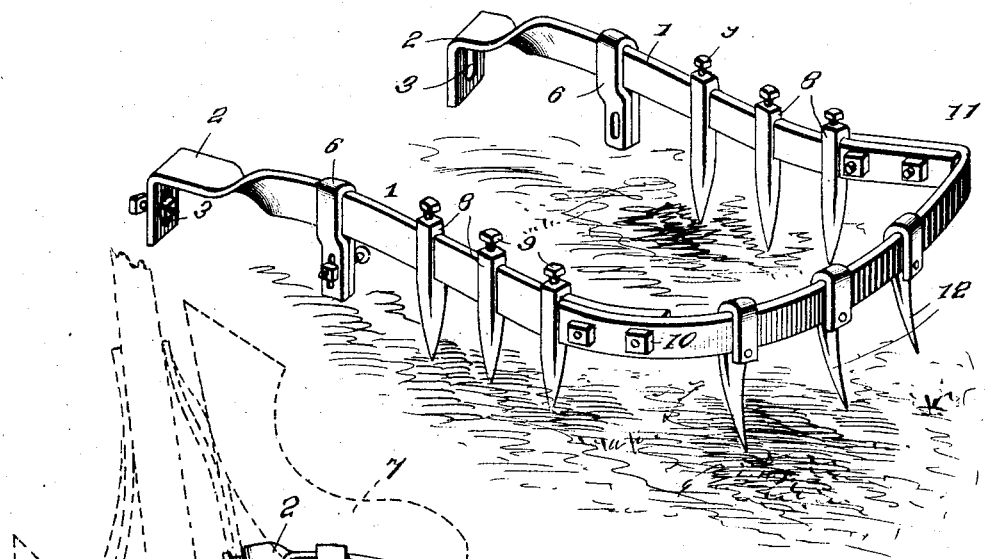
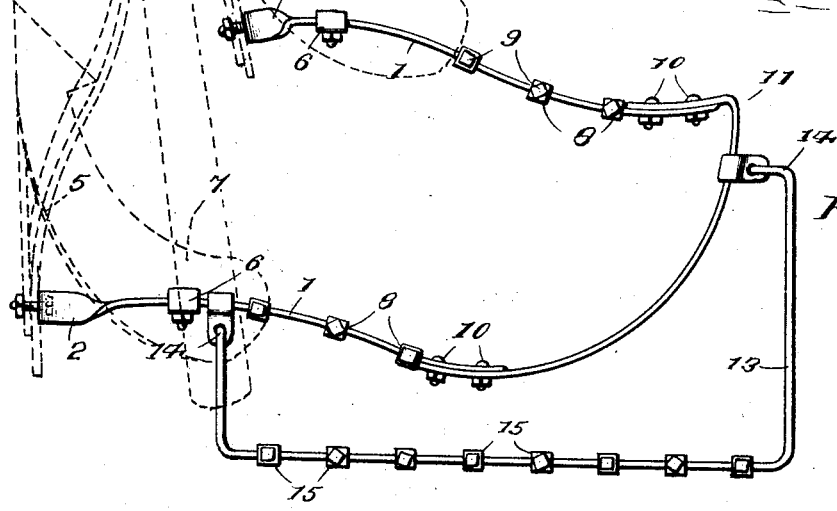
Inventor
Justus A. Davis.

No. 785,864. Patented March 28, 1905.

UNITED STATES PATENT OFFICE.

JUSTUS A. DAVIS, OF ROME, KANSAS.

HARROW ATTACHMENT.

SPECIFICATION forming part of Letters Patent No. 785,864, dated March 28, 1905.

Application filed October 15, 1904. Serial No. 228,604.

*To all whom it may concern:*

Be it known that I, JUSTUS A. DAVIS, a citizen of the United States, residing at Rome, in the county of Sumner and State of Kansas, have invented certain new and useful Improvements in Harrow Attachments, of which the following is a specification.

This invention embodies a harrow essentially designed for use in connection with gang-plows for crushing or reducing the soil as the ground is turned by the action of the implement.

The attachment comprises, essentially, a plurality of bars suitably mounted upon the standards of the plow and extended laterally therefrom, these bars being provided with the harrow-teeth, which, operating in rear of the several moldboards, will effectively pulverize the soil simultaneously with the plowing operation. The advantages arising in the use of the device are obvious, since it will be noted that the soil will retain its moisture because it is not allowed to dry or bake between the plowing and harrowing operations. Further, the attachment obviates the necessity of an independent reduction of the soil as commonly practiced, thereby saving the expense incident to the employment of labor in operating harrows for the above purpose, accomplishing a saving of time, which is of material importance.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still some of the preferred embodiments are shown in the accompanying drawings, in which—

Figure 1 is a perspective view of the invention. Fig. 2 is a plan view embodying a modification of the invention applied, the plow parts being shown in dotted lines.

Corresponding and like parts are referred to in the following description and indicated in both views of the drawings by the same reference characters.

As premised above, the invention is constructed with the view to being applied to plows of the gang type or the like; and the attachment consists, essentially, of spaced front and rear bars 1, provided at their front ends with extensions 2, projecting downwardly therefrom and formed with vertical slots 3, through which suitable fastenings may be passed for attachment of these portions of said bars 1 to standards 5, pendent from the frame of the plow in the common types of the latter. The provision of the slots 3 in the extensions 2 of the bars 1 admits of vertical adjustment of said bars, so as to vary the position of the latter relative to the ground in a manner which will be apparent. The bars 1 are not only attached to the standards 5 of the plow, but each of said bars has mounted thereon an attaching member, comprising a pendent arm or member 6, which receives the bar at its upper portion, being attached at its lower extremity to the adjacent moldboard 7. The lower extremity of each arm 6 is vertically slotted, so as to admit of adjustable connection of this part. Each arm 6 preferably consists of a bar looped about the respective bar 1 upon which it is mounted.

The bars 1 curve so as to conform to the curvature of the adjacent moldboard 7, to which they are attached, and upon each of the bars 1 are mounted a plurality of teeth 8 of a number dependent upon the character of soil being operated upon, and these teeth may be of any suitable type adapted for the purpose of the invention. The teeth 8, which are carried by the bars 1, are preferably of square form having lateral slots therein receiving the bars and adjusted in proper positions by means of set-screws 9, mounted in the upper extremities thereof. The outer ends of the bars 1 are connected by a connecting-bar 20, which latter is curved somewhat, being secured to the ends of the bars 1 by means of fastenings, such as bolts 10. One of the ends of the bar 20 is projected at an angle, as shown at 11, in order to facilitate attachment therewith of the adjacent rear bar 1. If desired, the connecting-bar 20 may be utilized as a support for a plurality of flat broad teeth 12, which latter curve rearwardly and serve to pack the soil rather than to reduce the same. The bar 20 reinforces the bars 1 in a manner which is clear and promotes a general rigidity of the harrow attachment.

It is contemplated within the spirit of the invention to utilize the bars 1 and 20 as a drag, so as to level the surface of the ground, and in this capacity the teeth 8 and 12 are dispensed with, the bars 1 being adjusted vertically so as to rest upon and thereby level the soil as the plow is advanced. The attachment is of simple construction and the manner of mounting same is such that the draft of the plow is not materially increased, if appreciably so, and this is of no small importance in a device of this class. The attachment likewise is less expensive than the heavy harrow, and because of its mounting upon the implement same has benefit of the weight of the latter in reducing the soil effectively.

In Fig. 2 a modification of the device embodying the invention is illustrated, and in this construction the device as above described is used, with the addition of a detachable bar 13. The bar 13 is curved between its ends and is provided with hooks 14 at its extremities for connection with the parts 1 and 20. The hooks 14 are received by eyes or loops projected from one of the bars 1 and from the end portion of the bar 20 adjacent to the angularly-projected extremity thereof. The bar 13 is provided with a suitable number of teeth (indicated at 15) and assists greatly in obtaining a thorough reduction of the soil as the plow advances. The bar 13 having a flexible connection virtually with the body of the attachment secured to the standard of the plow is adapted to accommodate the various inequalities in the ground over which it passes, this bar operating in rear of the rear bar 1.

It will be understood that the invention is adapted for application to sulky-plows or any other type of implements of this class. When the invention is used with a plow having a single standard only, but one of the bars 1 is utilized, said bar being provided with teeth and attached in a manner hereinbefore described.

Having thus described the invention, what is claimed as new is—

1. In a harrow attachment for plows, the combination of a bar provided at one end with an extension having an elongated slot therein, means for adjustably attaching said extension, a plurality of teeth carried by the bar, and an attaching-arm located between the ends of the bar and slotted for adjustable connection with a supporting part.

2. In a harrow attachment for plows, the combination of a plow of the gang type embodying supporting-standards, spaced bars extended from said standards, each of said bars having vertically-adjustable connection at one end to a respective standard, and a bar connecting the opposite ends of said spaced bars.

3. In combination, a plow of the gang type embodying supporting-standards and moldboards carried by said standards, spaced bars provided at respective ends with extensions, means for adjustably connecting the extension of each of said bars with a respective standard, adjustable connecting means between each bar and an adjacent moldboard, and teeth mounted upon the spaced bars aforesaid.

4. In combination, a plow of the gang type embodying supporting-standards and moldboards carried by said standards, spaced bars provided at respective ends with extensions, means for adjustably connecting the extension of each of said bars with a respective standard, adjustable connecting means between each bar and an adjacent mold board, a bar connecting the outer ends of the spaced bars aforesaid, and teeth carried by the spaced bars.

5. In combination, a plow of the gang type embodying supporting-standards and moldboards carried by the said standards, a bar extended from each standard and curved to conform with the shape of the adjacent moldboard, means for adjustably connecting each bar with the adjacent standard and moldboard, a bar connecting the outer ends of said spaced bars, and teeth carried by the spaced bars and the connecting-bar aforesaid.

6. In combination, a plow of the gang type, supporting-standards and moldboards carried thereby, spaced bars carried by respective standards and provided at respective ends with downwardly-projected extensions having vertical slots therein, fastenings passing through the slots of the extensions and through the standards adjacent, adjustable arms carried by the spaced bars and attached to the adjacent moldboard, a bar connecting the outer ends of the spaced bars, and a plurality of teeth carried by the spaced and connecting bars aforesaid.

7. In combination, a plow of the gang type embodying spaced standards, spaced bars extending from respective standards and connected therewith at one end, a bar connecting the outer ends of said spaced bars, a bar having loose or flexible connection with the bars aforesaid, and teeth carried by the last-mentioned bar.

In testimony whereof I affix my signature in presence of two witnesses.

JUSTUS A. DAVIS. [L. S.]

Witnesses:
P. T. WIMER,
E. B. WIMER.